United States Patent [19]
Jeng

[11] Patent Number: 5,609,802
[45] Date of Patent: Mar. 11, 1997

[54] HELMET MAKING PROCESS

[76] Inventor: Yen-Ming Jeng, 48, Fong Lean Street, Hsin-Fong, Hsiang, Hsin Chu Hsien, Taiwan

[21] Appl. No.: 612,031

[22] Filed: Mar. 7, 1996

[51] Int. Cl.⁶ .............. B29C 44/06; B29C 44/12
[52] U.S. Cl. .............. 264/46.5; 264/46.6; 264/69; 264/156; 264/161; 264/257; 264/338; 425/812
[58] Field of Search .............. 264/69, 46.5, 46.6, 264/156, 161, 257, 338; 425/812

[56] References Cited

U.S. PATENT DOCUMENTS

| | | | |
|---|---|---|---|
| 2,908,943 | 10/1959 | Miller | 264/46.6 |
| 3,935,044 | 1/1976 | Daly | 264/45.4 |
| 4,288,268 | 9/1981 | Hartung | 156/245 |
| 5,298,208 | 3/1994 | Sibley et al. | 264/51 |
| 5,324,460 | 6/1994 | Briggs | 264/46.6 |
| 5,376,318 | 12/1994 | Ho | 264/46.6 |

*Primary Examiner*—Allan R. Kuhns
*Attorney, Agent, or Firm*—Pro-Techtor International

[57] ABSTRACT

A helmet making process includes the steps of opening the upper die with flash gates; heating the upper and lower dies in a oven with the use of an endless conveying device; inserting shape-molded plastic upper and lower shells respectively into the lower and upper and lower dies; filling a polyurethane mixture into the upper shell; shaking the upper and lower dies; heating the upper and lower dies to allow the polyurethane mixture to be foamed completely; piercing the foamed polyurethane through the air holes in the upper die; removing the semi-finished helmet; cooling the semi-finished helmet in air; cutting off the flashes and projected portions and recessed portions of the upper and lower shells; trimming and surface-treating the semi-finished helmet to form a finished helmet.

5 Claims, 23 Drawing Sheets

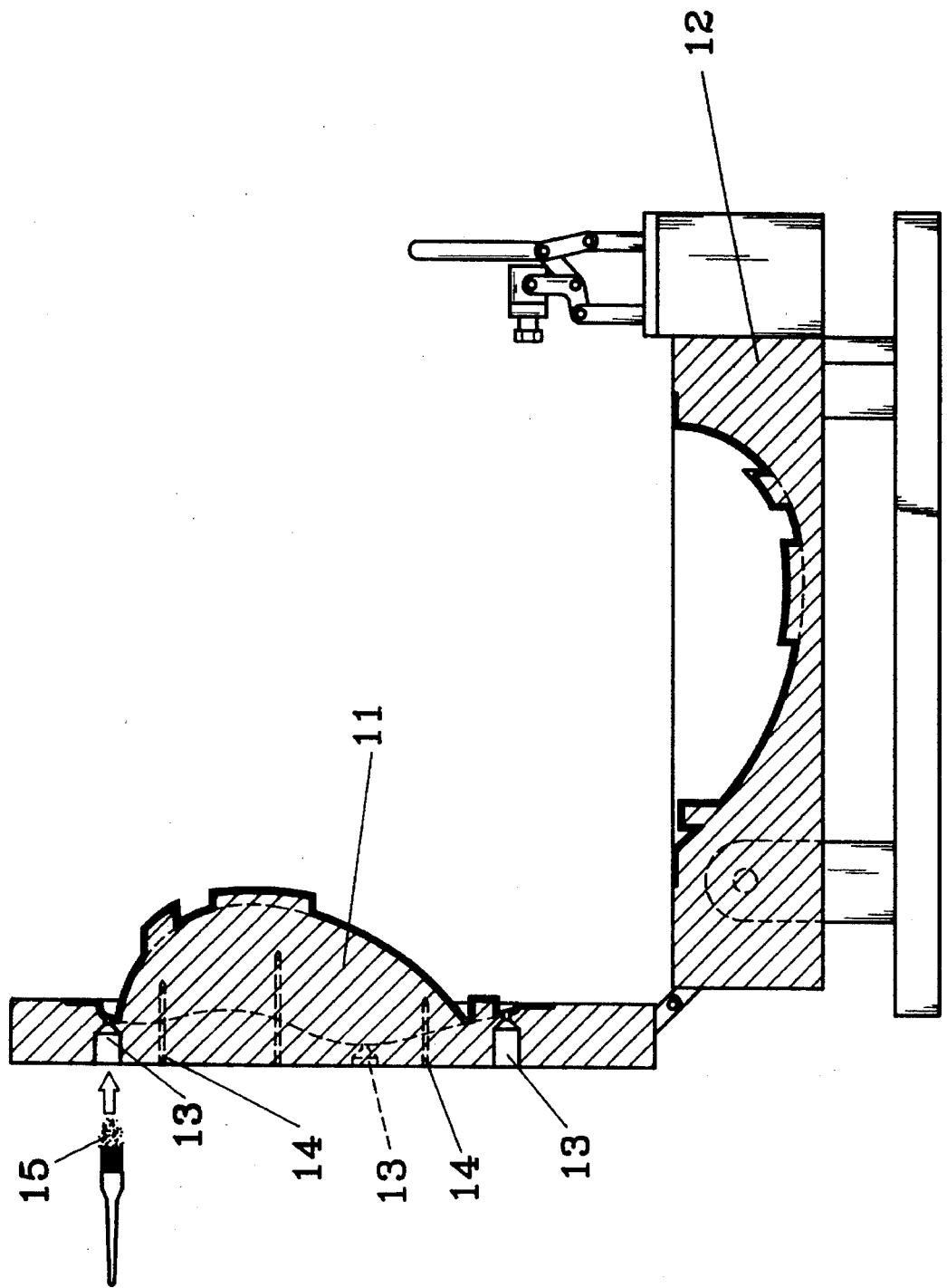

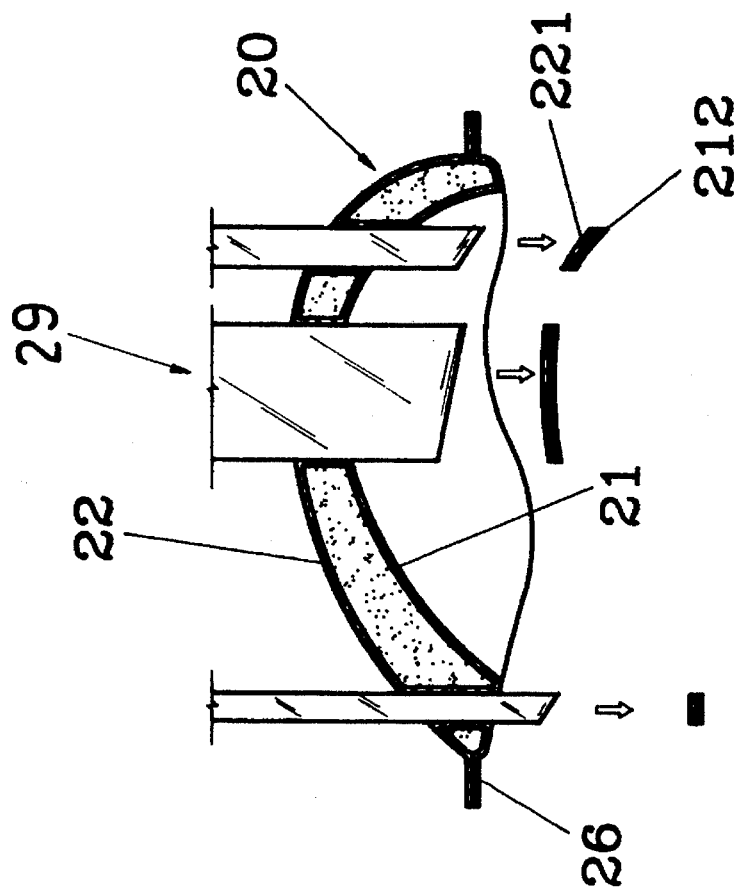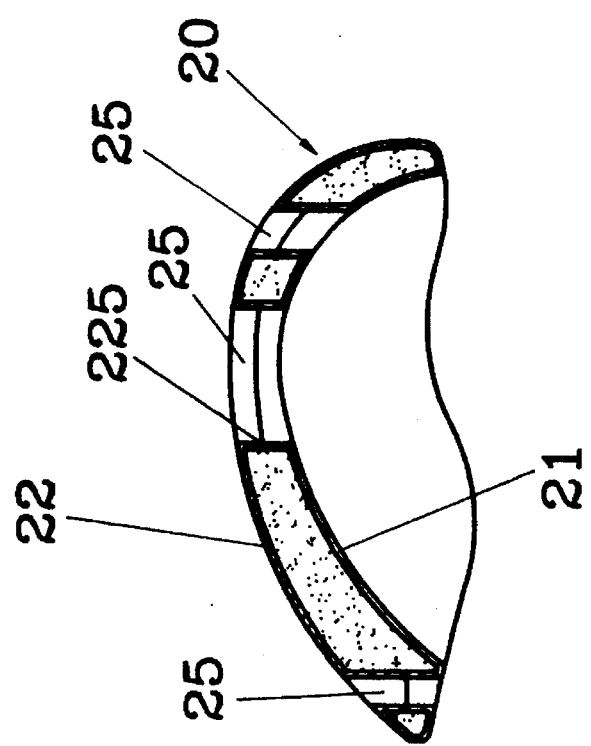
Fig. 13

HELMET MAKING PROCESS

BACKGROUND OF THE INVENTION

1. Field of the Invention

This invention relates to a process for making a helmet, and more particularly to a process for making a helmet for a motorcyclists, cyclists, skaters, etc.

2. Description of the Related Art

U.S. Pat. No. 5,376,318 disclosed a process for making a helmet with a plurality of ventilation holes for cyclists. Such a process suffers from the following disadvantages:

1. Each of the molds must have a heater and suction device mounted thereto in order to pre-heat the upper and lower dies of the mold and to deform the plastic film. Therefore, a number of heater and suction devices are required in the process, resulting in a high manufacturing cost. In addition, the formation of the bottom through holes in the lower dies increases the manufacturing cost.

2. The printing ink cannot be coated uniformly on the plastic film. The plastic film can only be printed with one color and cannot be printed with regular patterns.

3. Since the liquefied polyurethane mixture is not shaken sufficiently when being filled into the lower die, well foaming of the polyurethane cannot be achieved. The density of the foamed polyurethane is not uniform and gas bubbles are formed in the surface of the foamed polyurethane. In addition, because there is no flash gate in the upper die, the air holes in the upper die is liable to be blocked by the foamed polyurethane.

4. Since the cavity of the lower die is covered with the plastic film which has no air holes and there is no hole-making steps after the polyurethane mixture is foamed, gas bubbles is liable to formed between the contact faces of the plastic film and the foamed polyurethane. Therefore, the density of the helmet thus obtained is not uniform.

5. The printing ink cannot be coated uniformly to the shape-molded plastic shell because of configuration of the cavity of the lower die. Therefore, the color formed on the external surface of the helmet is not uniform. In addition, because the shape-molded plastic shell has not air holes, gas bubbles are liable to form between the contact faces of the foamed polyurethane and the shell.

SUMMARY OF THE INVENTION

It is therefore an object of the present invention to provide a process for making a helmet which has a foamed polyurethane that has a uniform density and has no gas bubbles formed therein and which can be made selectively with both the upper and lower shells or only the upper shell.

It is another object of the present invention to provide a process for making a helmet in which a heating device, a suction pump, and a plurality of bottom through holes need not be provided in each mold in order to reduce the manufacturing cost.

Still another object of the present invention is to provide a process for making a helmet having evenly distributed colors and a predetermined pattern printed thereon.

According to one aspect of the present invention, a helmet making process comprises the steps of:

(a) opening an upper die which is formed with flash gates and air holes relative to a lower die which is attached to a conveying device, cleaning the upper and lower dies, heating the upper and lower dies to a temperature of 35° C. to 40° C. in an oven, and applying a releasing agent to the outlet ends of the flash gates;

(b) fitting a shape-molded plastic lower shell into the upper die, the lower shell being printed with evenly distributed colors in a predetermined pattern and having a plurality of recessed portions and a plurality of flash holes that are formed through the outer periphery of the lower shell;

(c) filling a liquefied polyurethane mixture on a shape-molded plastic upper shell with a plurality of projected portions from a polyurethane mixing and discharging machine and then fitting the upper shell into the lower die;

(d) closing the upper die and shaking the upper and lower dies when the upper and lower dies are moved by means of the conveying device in order to apply uniformly the liquefied polyurethane mixture to the internal wall faces of the upper and lower shells and in order to allow the liquefied polyurethane mixture to begin to foam;

(e) delivering slowly the upper and lower dies into the oven to heat the upper and lower dies about 2 to 5 minutes in order to allow the polyurethane mixture to be nearly completely foamed;

(f) removing the upper and lower dies from the oven while the polyurethane mixture is foaming to allow a part of a foamed polyurethane to expand into the flash gates of the upper die and to form as flash, and then piercing through the air holes of the upper die and through the lower shell by means of needles in order to allow the gas produced from the foamed polyurethane to escape to an exterior of the upper die through the air holes;

(g) removing the flash and removing a semi-finished helmet thus obtained and piercing internal wall faces of the recessed portions in order to form a plurality of vent holes to allow the gas to escape through the vent holes and then allowing the semi-finished helmet to cool in air; and (h) cutting off the recessed and projected portions which abut complementarily one another from the upper and lower shells by means of a cutting tool in order to form a plurality of ventilation holes in the semi-finished helmet and then trimming and surface-treating the semi-finished helmet to produce a finished helmet.

According to another aspect of the present invention, a helmet making process comprises the steps of:

(a) opening an upper die relative to a lower die, cleaning the upper and lower dies and then heating the upper and lower dies to a temperature of 35° C. to 40° C. in an oven, the lower die having a front end which is provided with an air hole;

(b) applying an releasing agent onto the internal face of the lower die;

(c) applying a painting onto the releasing agent of the internal face of the lower die;

(d) heating the painting for about 1 to 1.5 minutes or blowing the painting by air in order to dry the painting on the internal face of the lower die;

(e) placing a fibrous reinforcement on the internal face of the lower die;

(f) fitting a shape-molded plastic upper shell which is printed with a predetermined pattern into the upper die;

(g) filling a liquefied polyurethane mixture into the lower die from a polyurethane mixing and discharging machine;

(h) closing the upper die in order to permit the polyurethane mixture to begin to foam;

(i) shaking the upper and lower dies to permit the polyurethane mixture to be applied uniformly onto the internal face of the lower die and an internal face of the upper shell;

(j) setting the upper and lower dies upright in order to permit a gas produced therein to escape through the air hole of the lower die;

(k) heating the upper and lower dies in an oven for about 2 to 5 minutes to permit the polyurethane mixture to be foamed completely and to permit the painting to be hot-printed onto the foamed polyurethane;

(l) removing the upper and lower dies from the oven, cutting off a flash outside the air hole, removing a semi-finished helmet from the upper and lower dies, piercing through the semi-finished helmet by means of needles in order to form a plurality of vent holes which permit a residue gas in the semi-finished helmet to escape to an exterior of the semi-finished helmet, and cooling in air for at least 8 hours.

BRIEF DESCRIPTION OF THE DRAWINGS

Other features and advantages of the present invention will become apparent in the following detailed description of the preferred embodiments, with reference to the accompanying drawings, of which:

FIG. 3 is a sectional schematic view illustrating how a releasing agent is applied to a flash gate in the upper die.

FIGS. 13(A) and 13(B) are sectional schematic view illustrating how the recession portions of the helmet are cut by means of a cutting tool.

DETAILED DESCRIPTION OF THE PREFERRED EMBODIMENT

Figure 1:
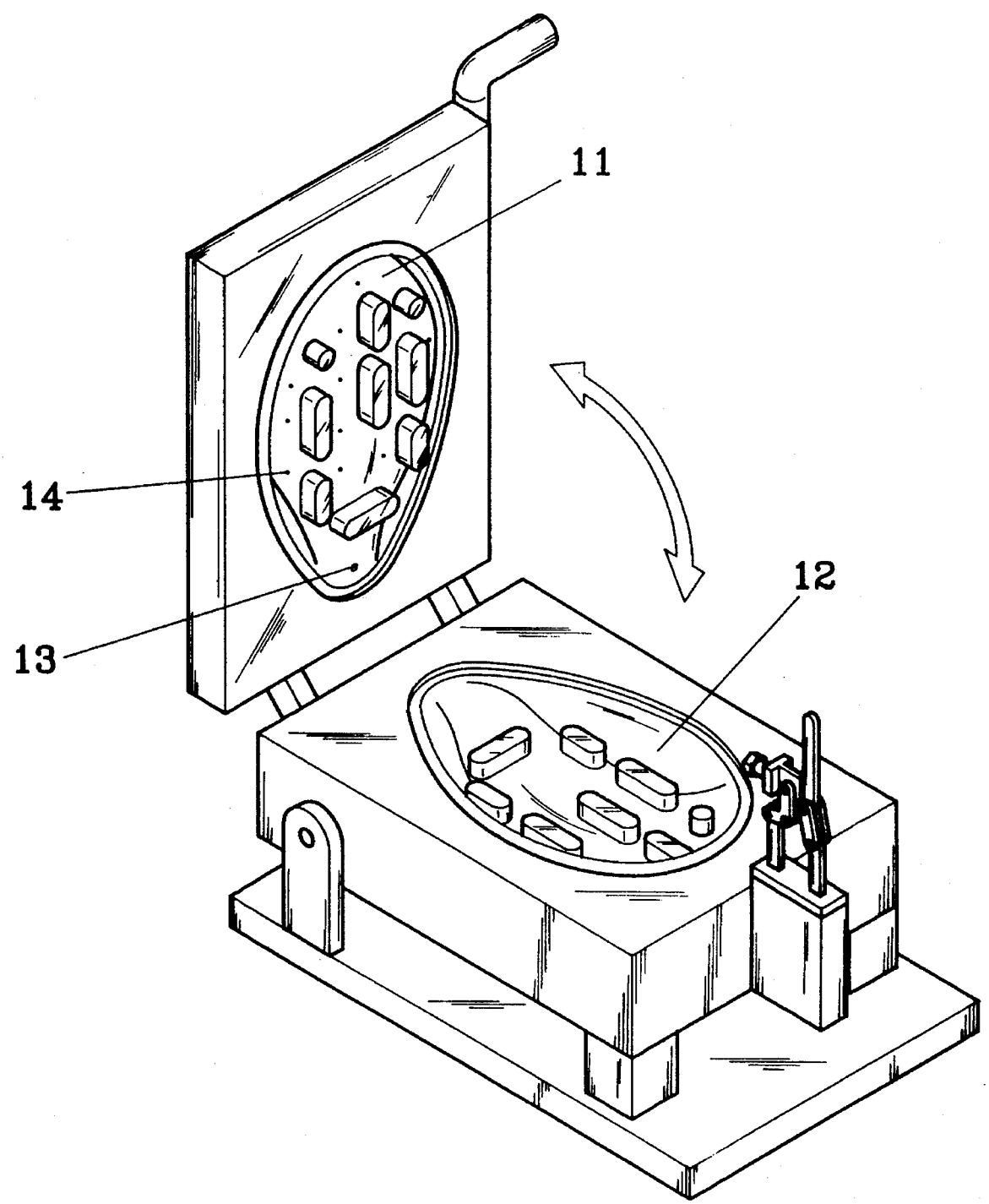
FIG. 1 is a perspective schematic view illustrating the upper die being opened relative to the lower die of the first preferred embodiment of a helmet making process according to the present invention.
Figure 2:
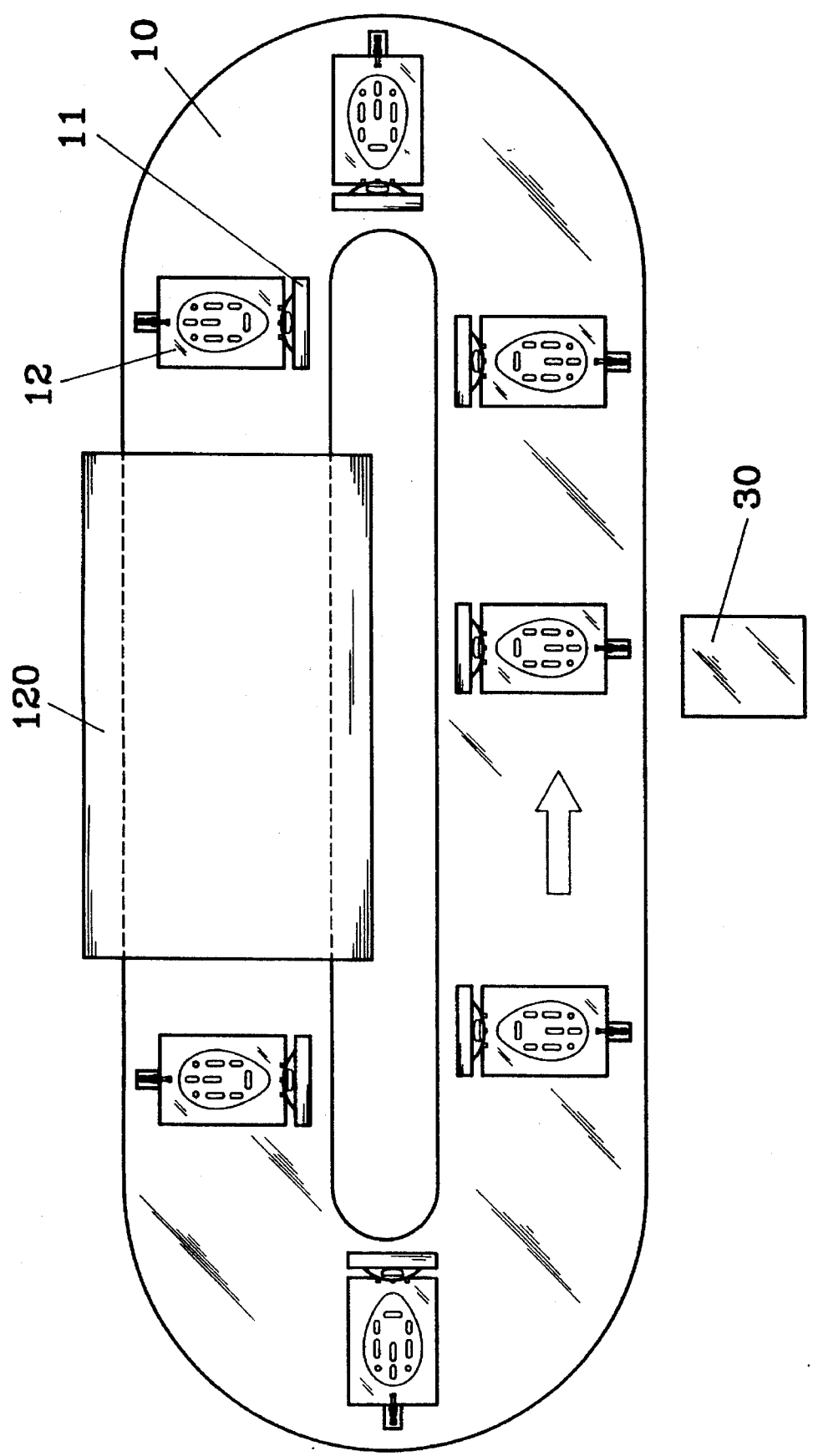
FIG. 2 is a top view illustrating how the upper and lower dies are disposed on a conveying device and pass through an oven for pre-heating purposes.
Figure 5:
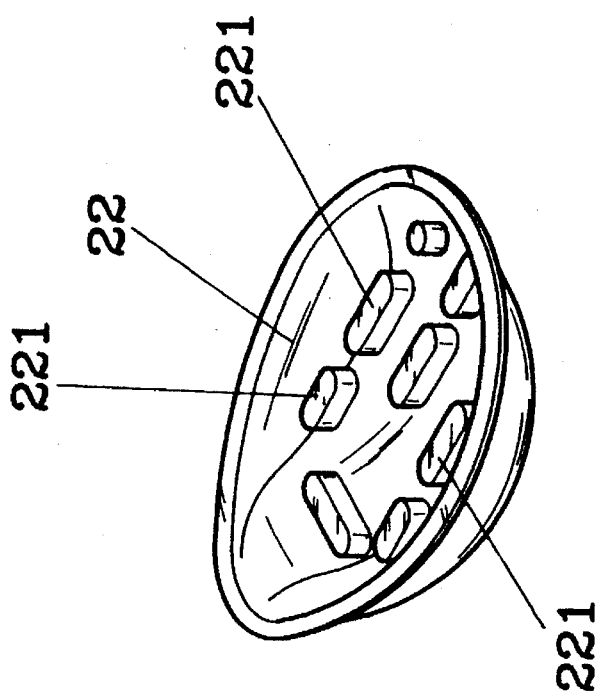
FIG. 5 is a perspective view illustrating a shape-molded plastic upper shell which has been printed with evenly distributed colors in a predetermined pattern according to the present invention.
Figure 4:
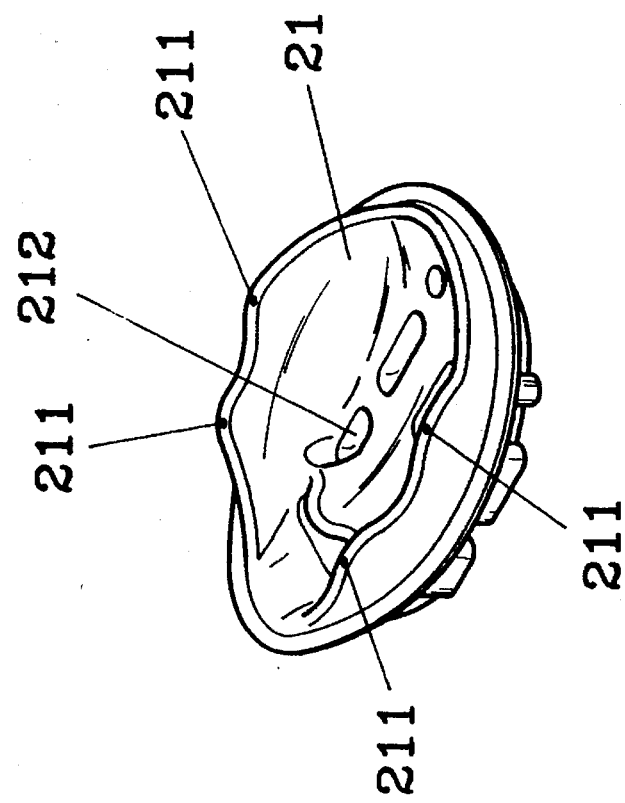
FIG. 4 is a perspective view illustrating a shape-molded plastic lower shell which has been printed with evenly distributed colors in a predetermined pattern according to the present invention.
Figure 6:
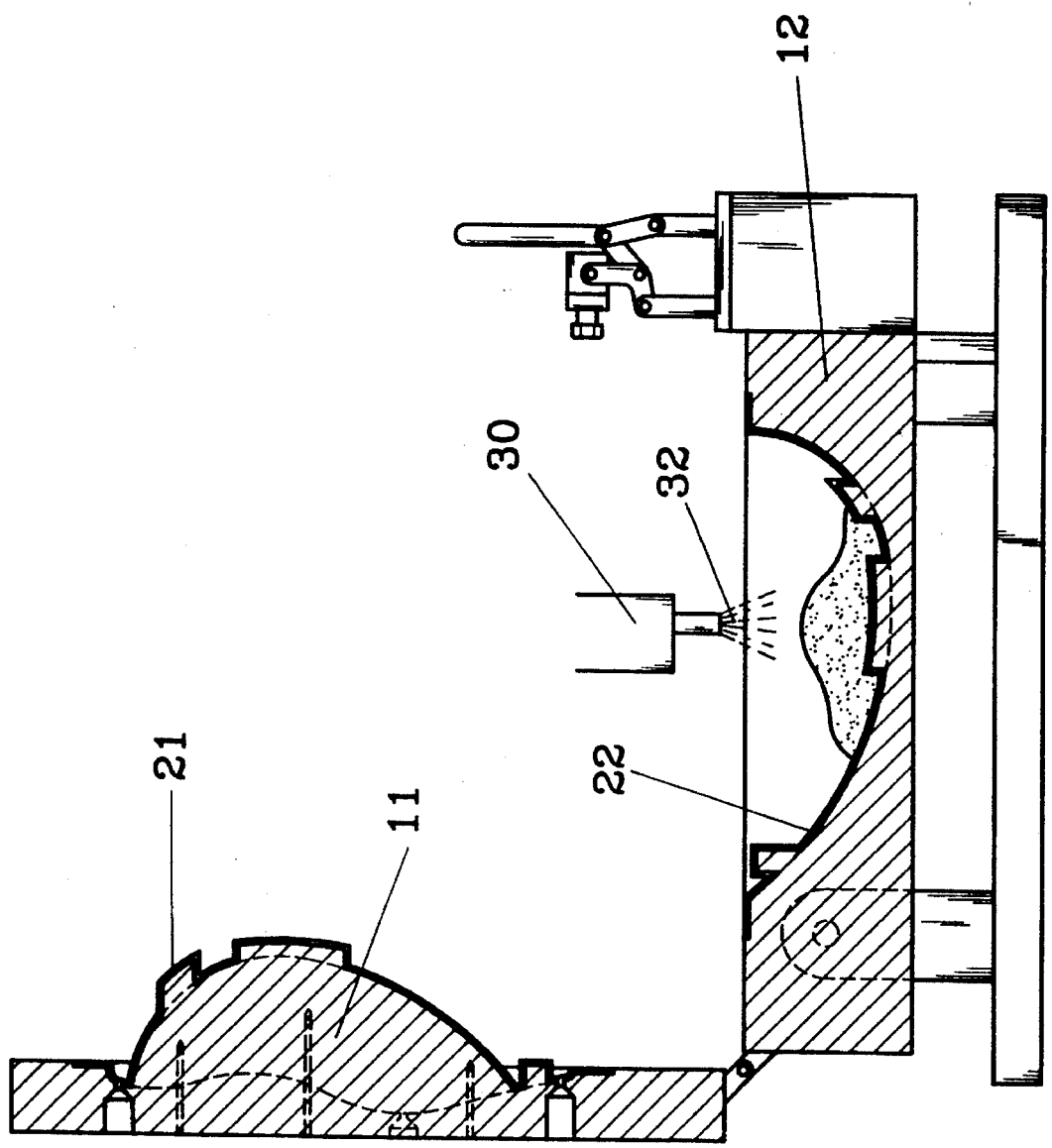
FIG. 6 is a sectional schematic view illustrating how a liquefied polyurethane mixture fills into the upper shell in the lower die according to the present invention.
Figure 7:
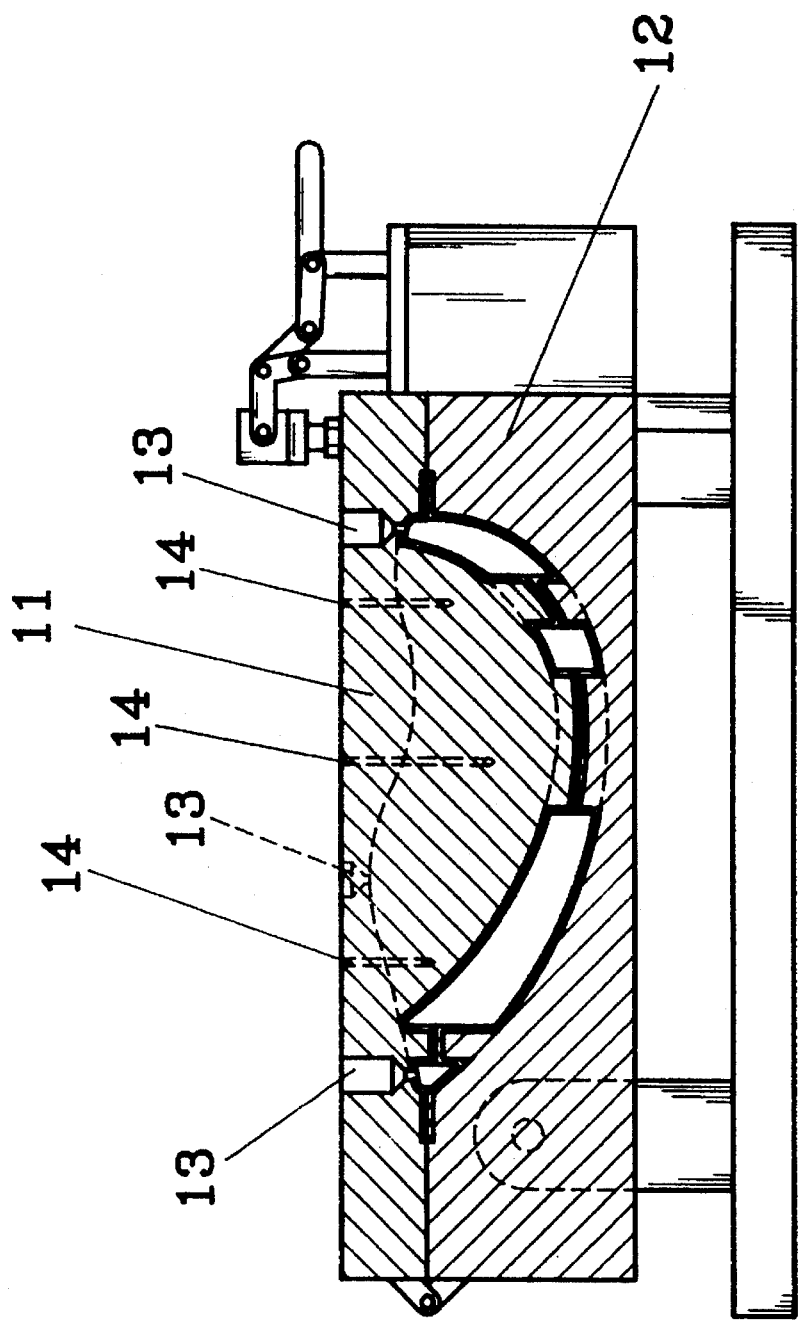
FIG. 7 is a sectional view illustrating the upper and lower dies being closed together.
Figure 8:
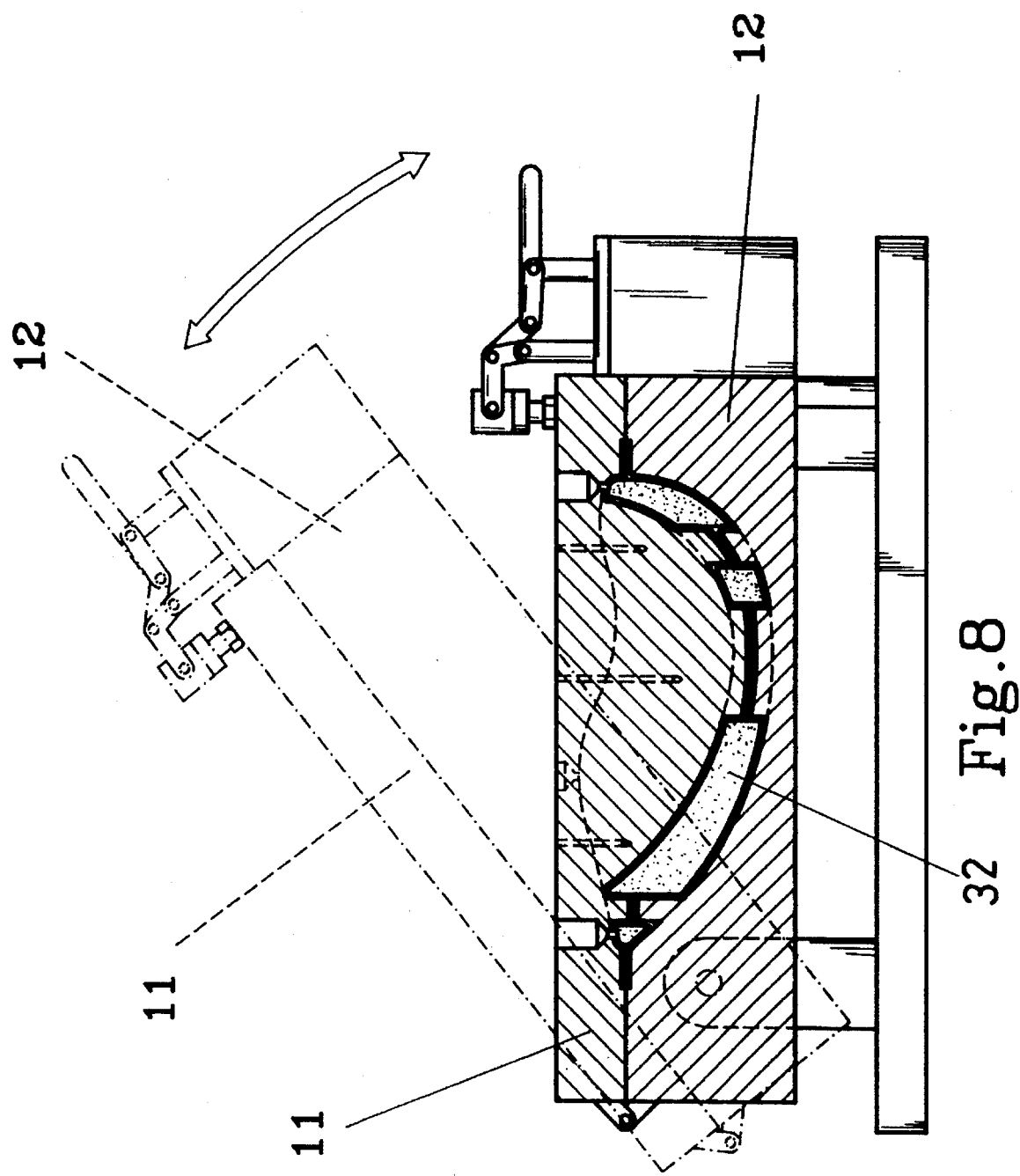
FIG. 8 is a sectional schematic view illustrating how the upper and lower dies are shaken according to the present invention.
Figure 9:
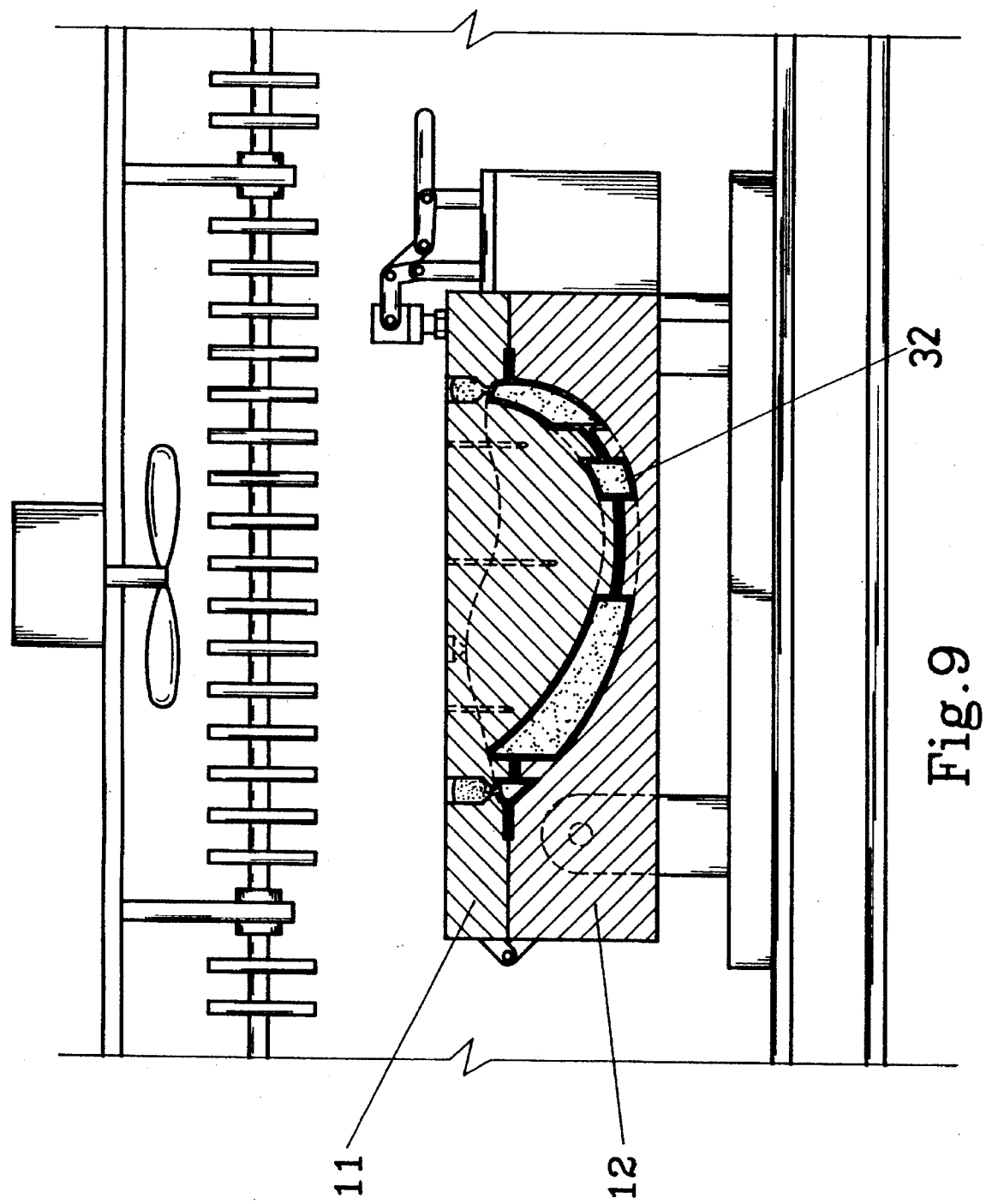
FIG. 9 is a sectional schematic view illustrating how the upper and lower dies are heated by the oven and how the polyurethane mixture is foamed.
Figure 10:
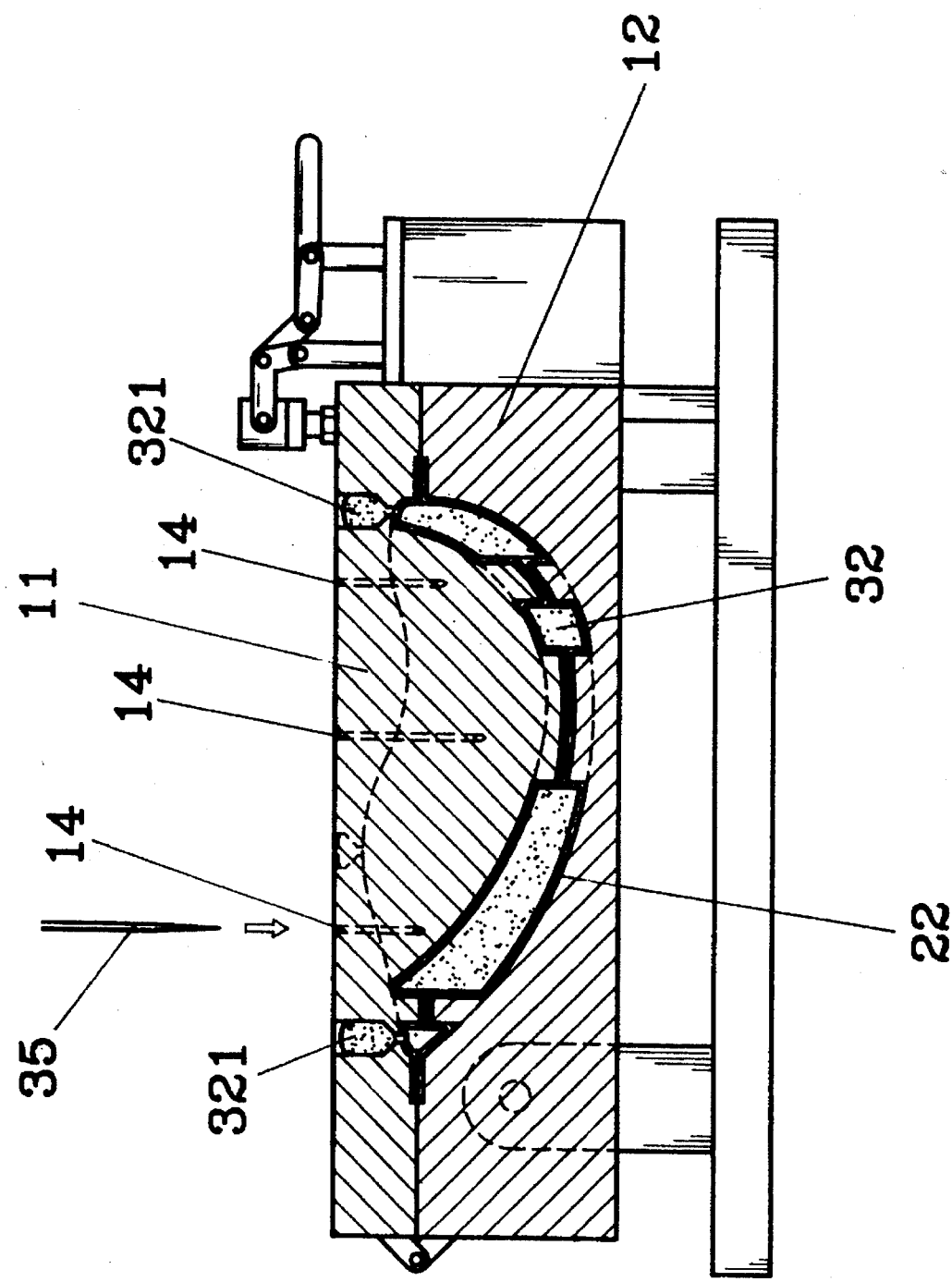
FIG. 10 is a sectional schematic view illustrating how the upper and lower dies are moved out of the oven and how the foamed polyurethane is pierced by needles.
Figure 11:
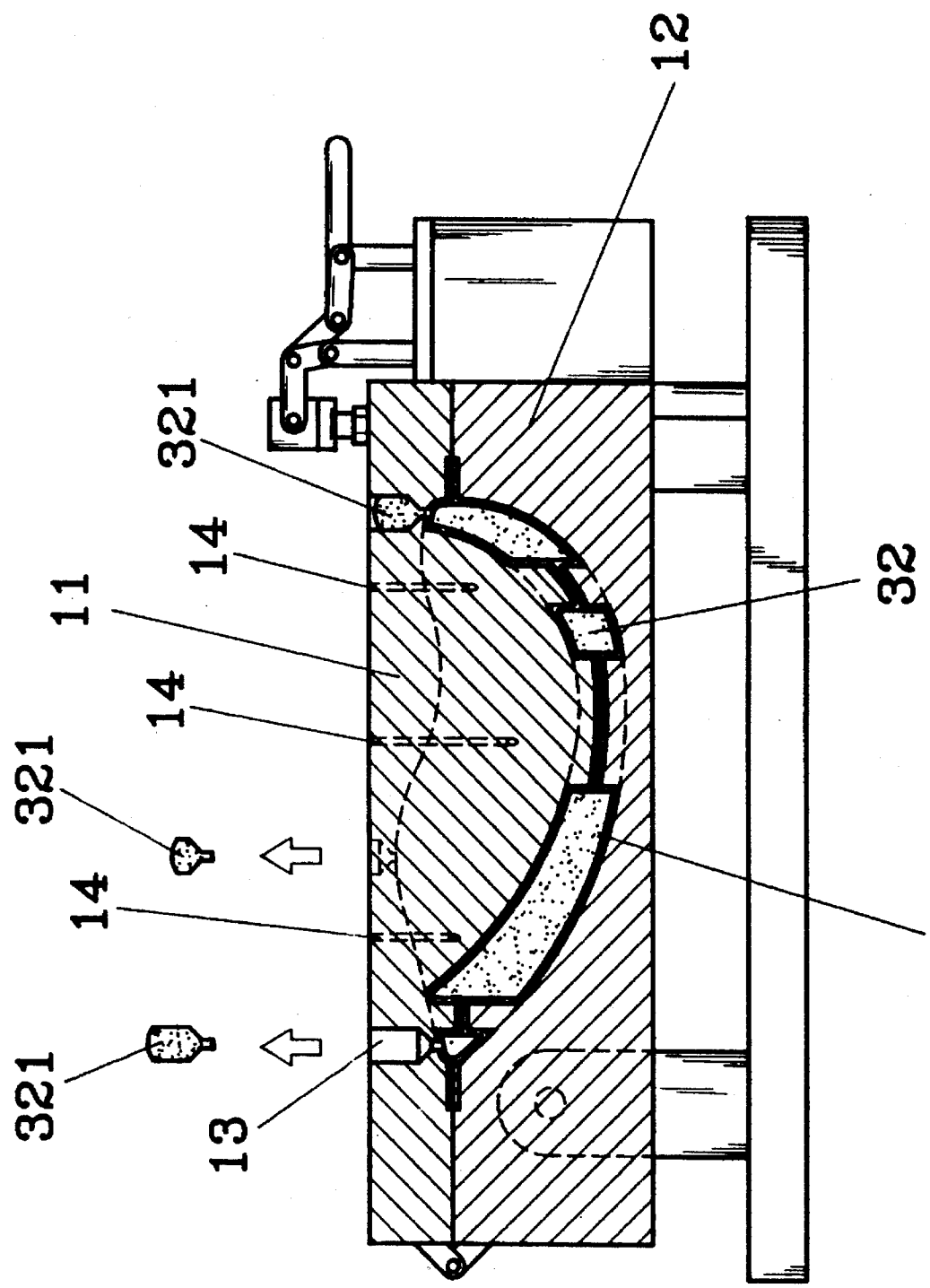
FIG. 11 is a sectional schematic view illustrating the flashes being removed from the flash gates of the upper die.
Figure 12:
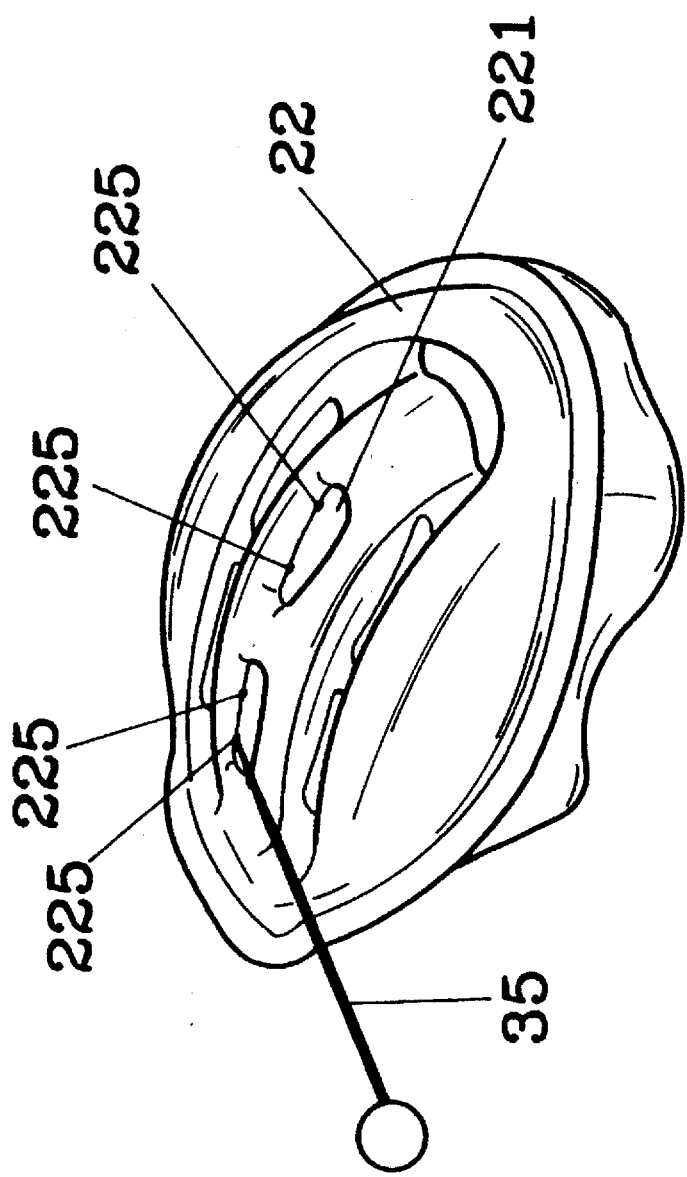
FIG. 12 is a perspective schematic view illustrating how the internal wall of the recesses portions of the helmet is pierced by means of a needle.
Figure 14:
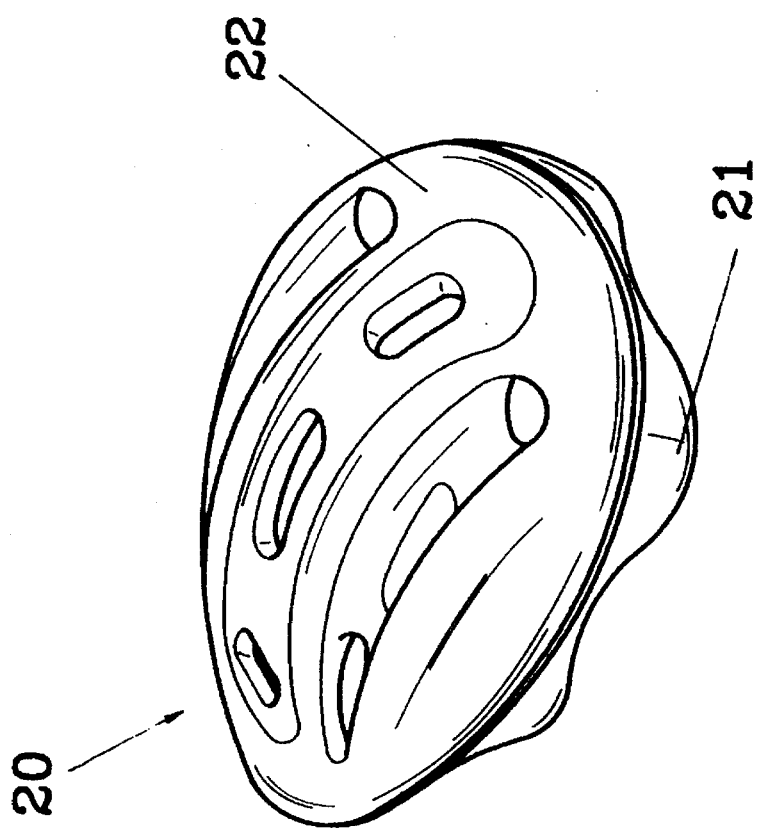
FIG. 14 is a perspective view of a finished helmet which is produced by the first preferred embodiment according to the present invention.

Referring to FIGS. 1 to 14, a first preferred embodiment of a process for making a helmet 20 which is formed with an upper shell 22 and a lower shell 21 according to the present invention comprises the steps of:

(a) opening an upper die 11 which is formed with flash gates 13 and air holes 14 relative to a lower die 12 which is connected pivotally to a conveying device 10, as shown in FIGS. 1 and 2, cleaning the upper and lower dies 11, 12, heating the upper and lower dies to a temperature of 35° C. to 40° C. in an oven 120, and applying a releasing agent 15 to the outlet ends of the flash gates 13, as shown in FIG. 3;

(b) fitting a shape-molded plastic lower shell 21 into the upper die 11, the lower shell 21 being printed with evenly distributed colors in a predetermined pattern and having a plurality of recessed portions 212 and a plurality of flash holes 211 that are formed through the outer periphery of the lower shell 21, as shown in FIG. 4;

(c) filling a liquefied polyurethane mixture 32 on a shape-molded plastic upper shell 22 with a plurality of projected portions 221 from a polyurethane mixing and discharging machine 30, as shown in FIGS. 5 and 6, and then fitting the upper shell 22 into the lower die 12;

(d) closing the upper die 11, as shown in FIG. 7, and shaking the upper and lower dies 11, 12, as best illustrating in FIG. 8, when the upper and lower dies 11, 12 are moved by means of the conveying device 10 in order to apply uniformly the liquefied polyurethane mixture 32 to the internal wall faces of the upper and lower shells 22, 21 and in order to allow the liquefied polyurethane mixture 32 to begin to foam;

(e) delivering slowly the upper and lower dies 11, 12 into the oven 120 to heat the upper and lower dies 11, 12 about 2 to 5 minutes in order to allow the polyurethane mixture 32 to be nearly completely foamed, as shown in FIG. 9;

(f) removing the upper and lower dies 11, 12 from the oven 120 while the polyurethane mixture 32 is foaming to allow a part of a foamed polyurethane to expand into the flash gates 13 of the upper die 11 and to form as a flash 321, and then piercing through the air holes 14 of the upper die 11 and through the lower shell 21 by means of needles 35 in order to allow the gas produced from the foamed polyurethane to escape effectively to an exterior of the upper die 11 through the air holes 14, as shown in FIG. 10;

(g) removing the flash 321, as shown in FIG. 11, and removing a semi-finished helmet 20 thus obtained and piercing internal wall faces of the recessed portions 221 of the upper shell 22 by a needle 35 in order to form a plurality of vent holes 225 to allow the gas to escape completely through the vent holes 225, as shown in FIG. 12, and then allowing the semi-finished helmet 20 to cool in air; and (h) cutting off the recessed and projected portions 221, 212 which abut complementarily one another from the upper and lower shells 22, 21 by means of a cutting tool 29 in order to form a plurality of ventilation holes 25 in the semi-finished helmet, as shown in FIGS. 13(A) and 13(B), and then trimming and surface-treating the semi-finished helmet by cutting off the excess material 26 and flashes 321 on the external face of the lower shell 21 in order to produce a finished helmet 20, as shown in FIG. 14.

Figure 24:
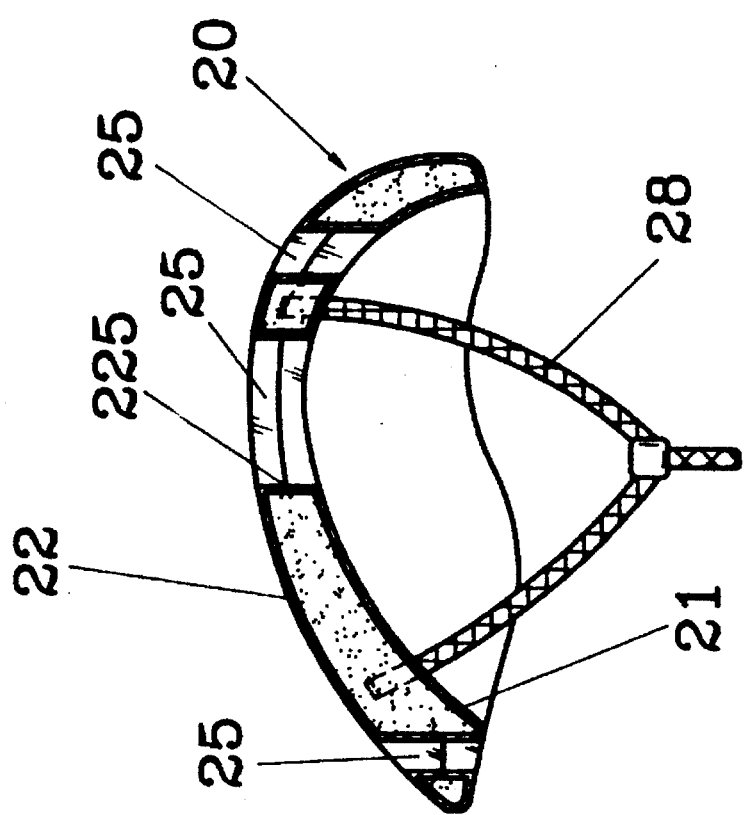
FIG. 24 is a sectional schematic view illustrating the finished helmet produced by the first preferred embodiment which has an attachment fastened thereto.

Predetermined attachments 28 can be fastened to the upper and lower shells 22, 21 of the finished helmet 20, as best illustrated in FIG. 24.

Figure 15B:
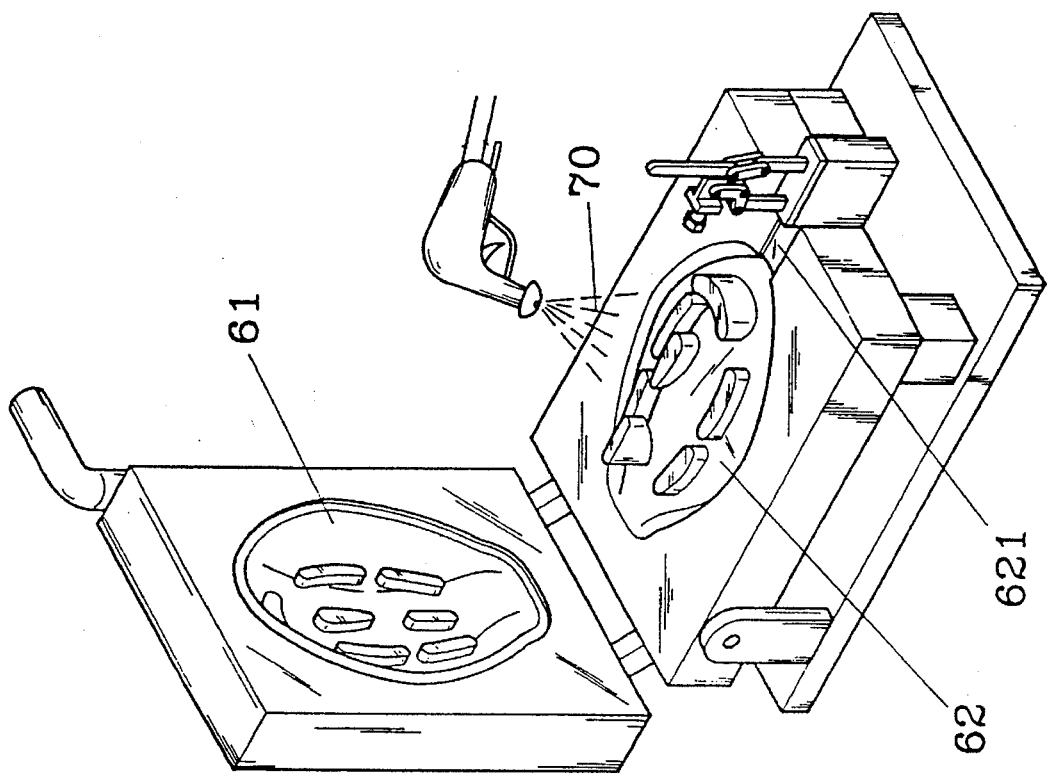
FIG. 15(B) is a perspective schematic view illustrating how a painting is applied to the internal face of a lower die according to the second preferred embodiment of the present invention.
Figure 15A:
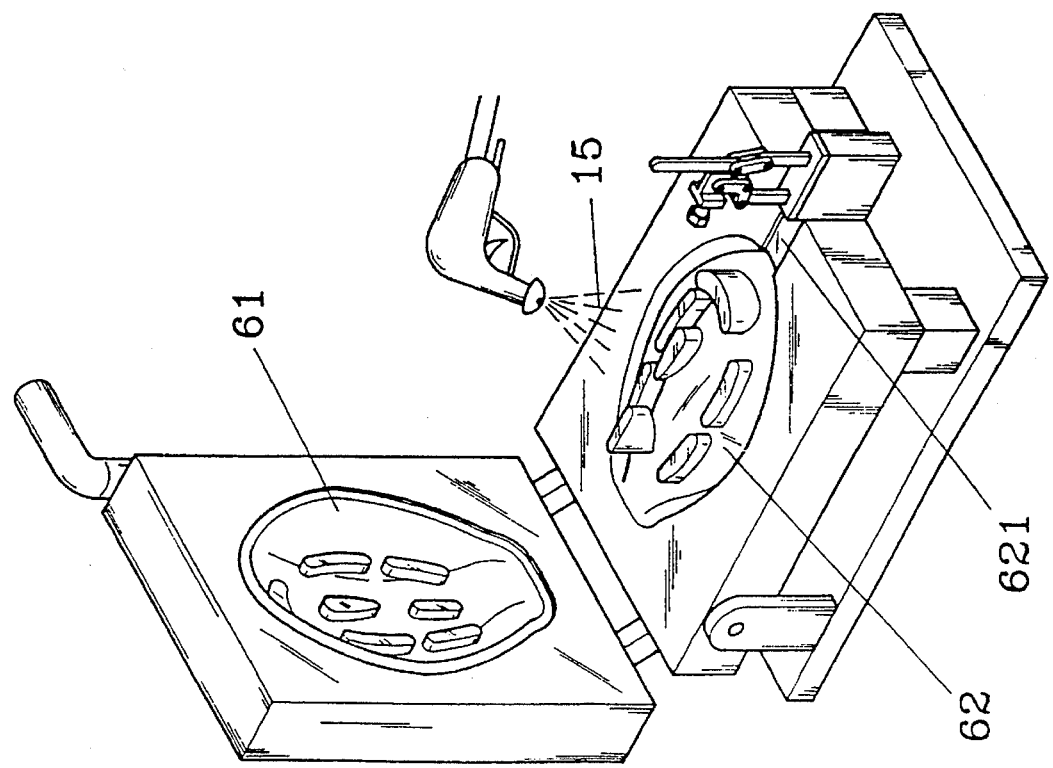
FIG. 15(A) is a perspective schematic view illustrating how a releasing agent is applied to the internal face of a lower die according to the second preferred embodiment of a helmet making process of the present invention.
Figure 16:
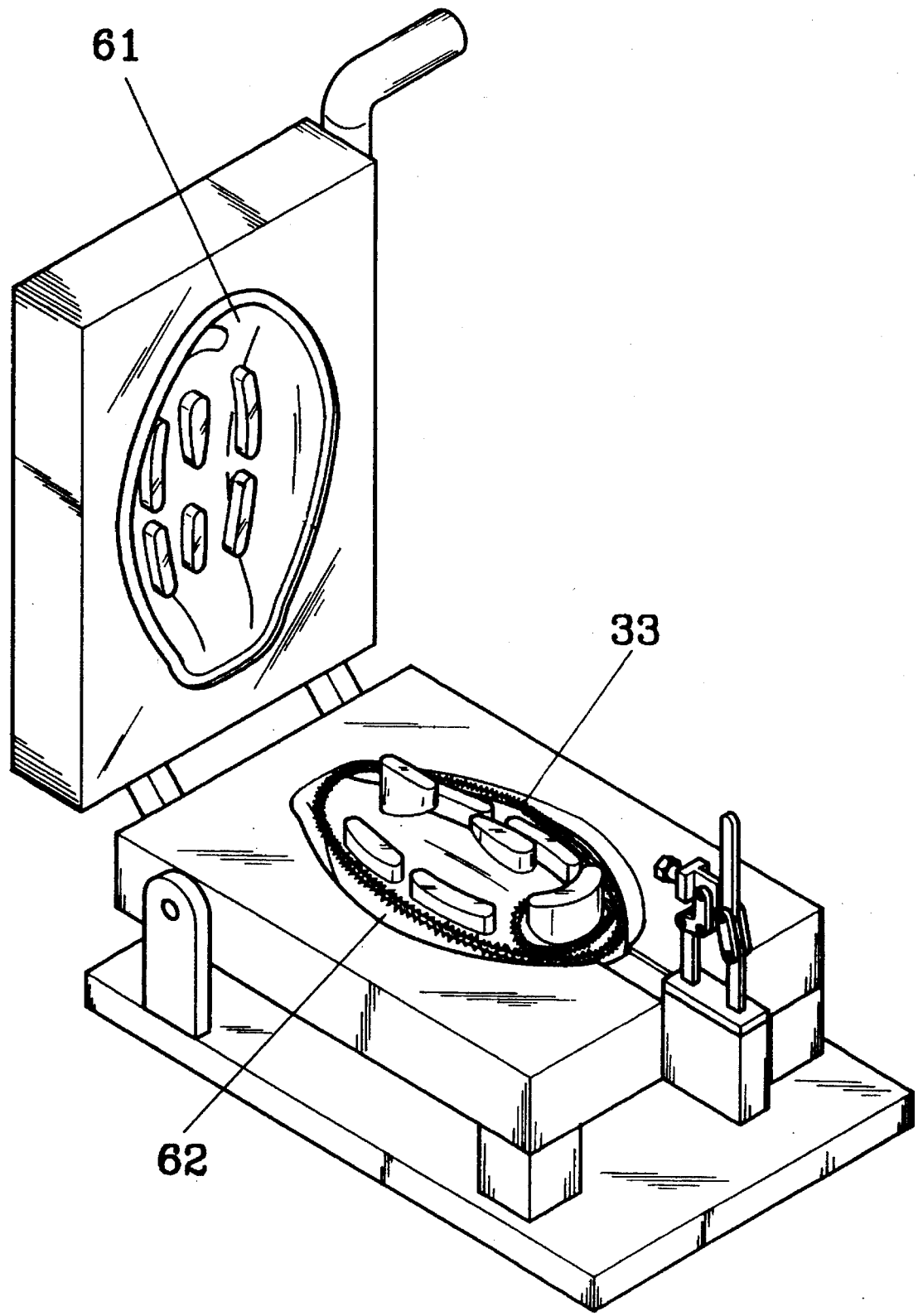
FIG. 16 is a perspective schematic view illustrating a fibrous reinforcement being disposed on in the lower die according to the second preferred embodiment of the present invention.
Figure 17:
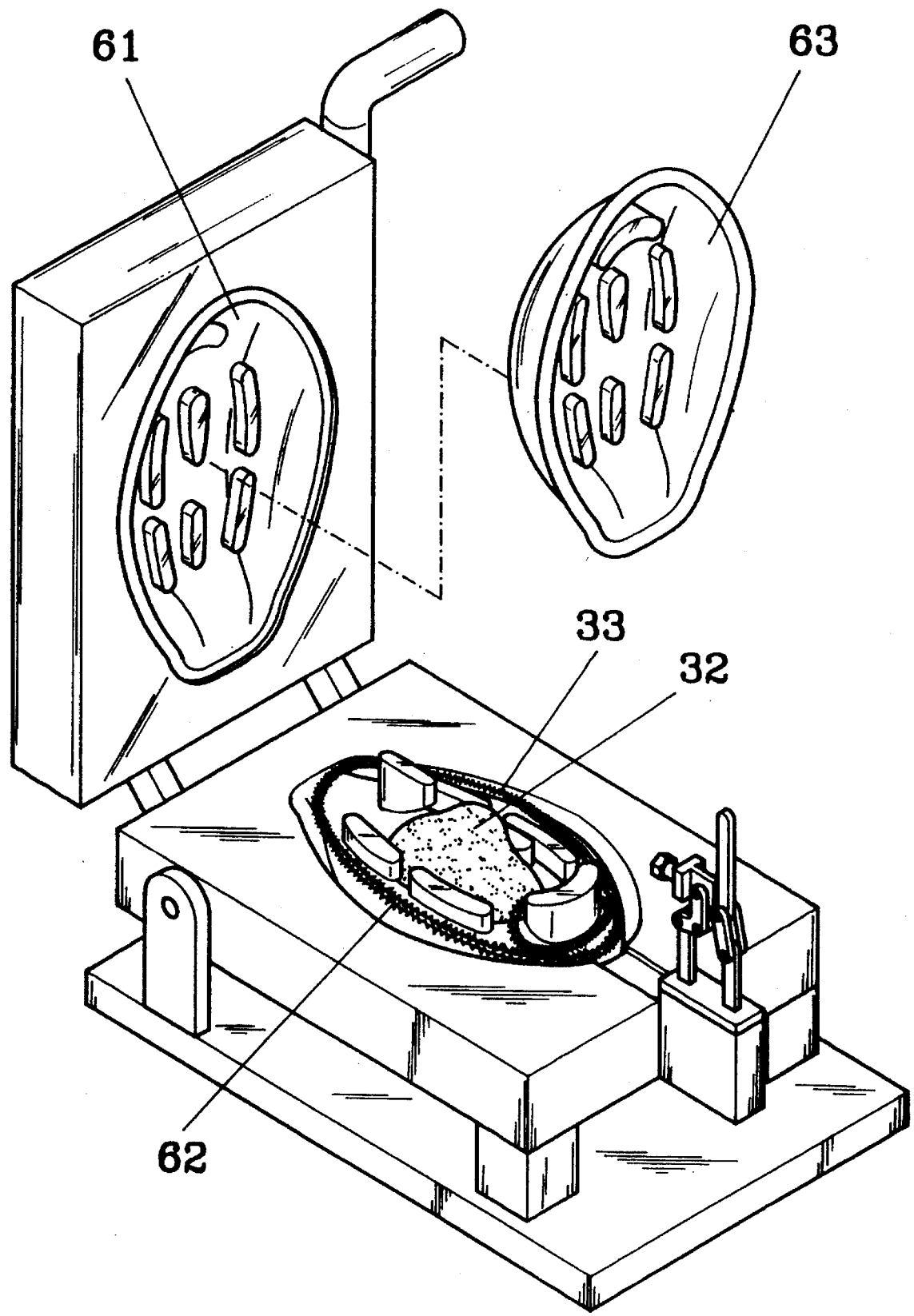
FIG. 17 is a perspective schematic view illustrating how a shape-molded plastic upper shell is fitted into the upper die and a liquefied polyurethane mixture is filled into the lower die according to the second preferred embodiment of the present invention.
Figure 18:
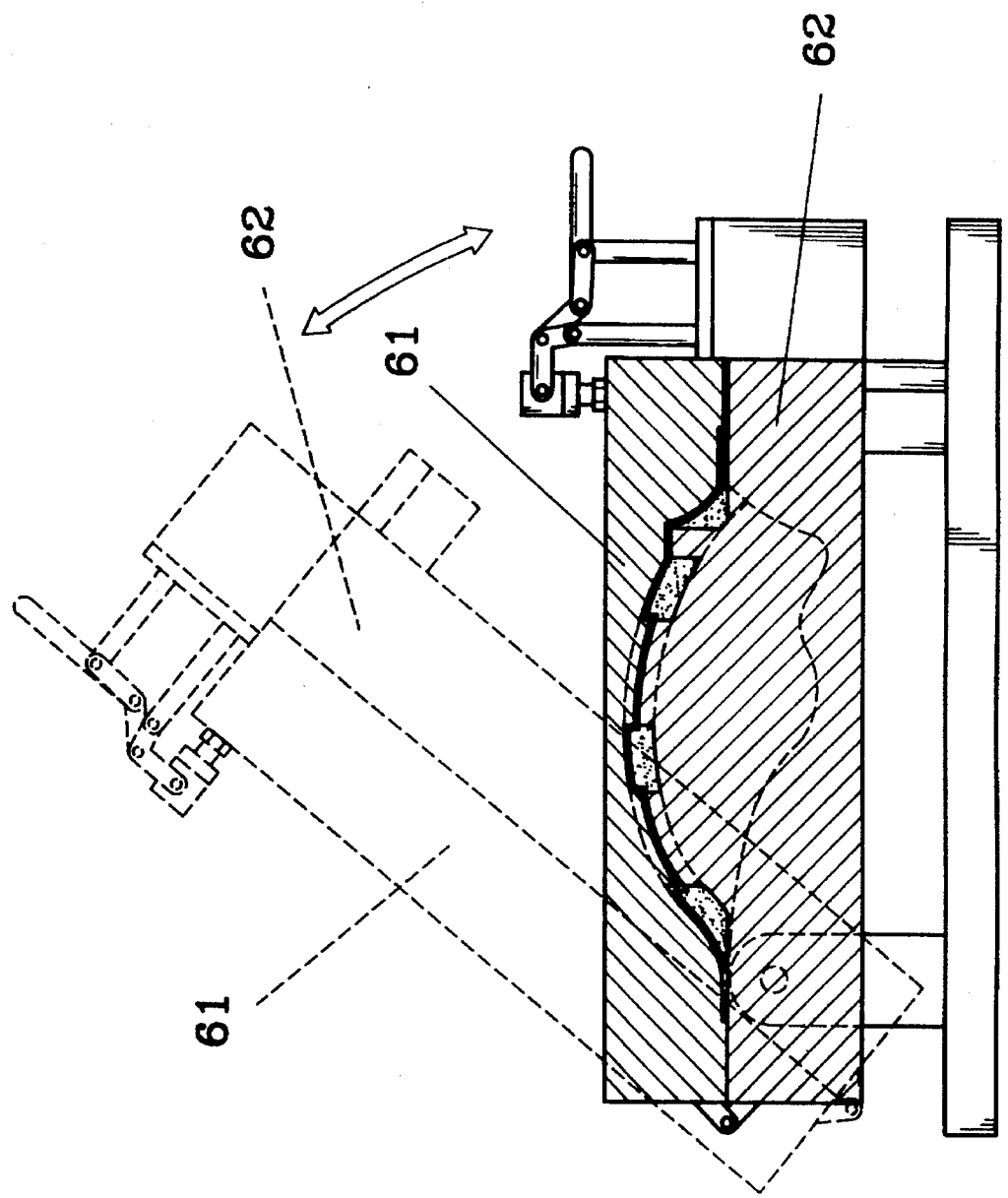
FIG. 18 is a sectional schematic view illustrating how the upper and lower dies are shaken according to the second preferred embodiment.
Figure 19:
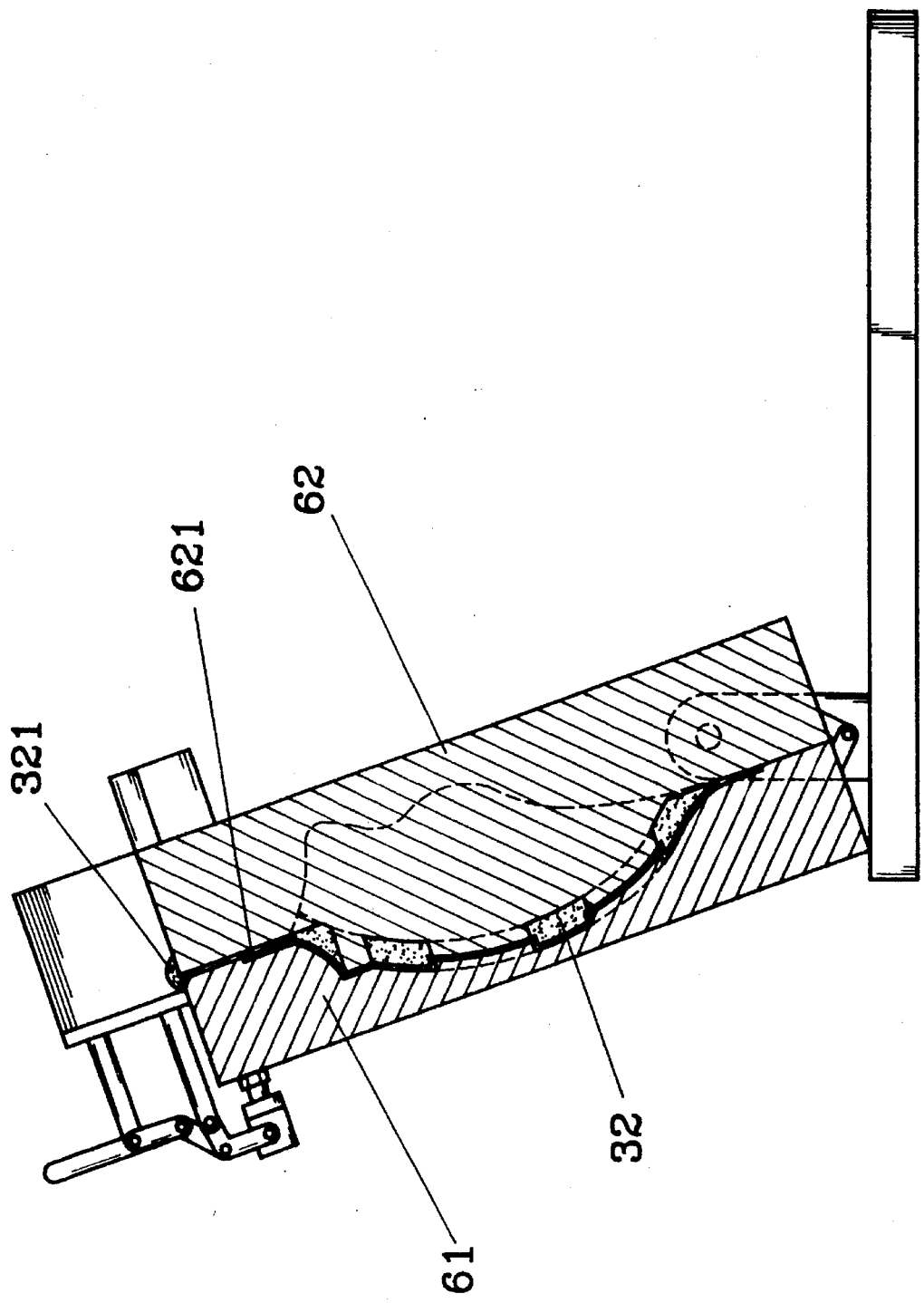
FIG. 19 is a sectional schematic view illustrating how the upper and lower dies are set upright and heated in a oven to permit the polyurethane mixture to be foamed.
Figure 20:
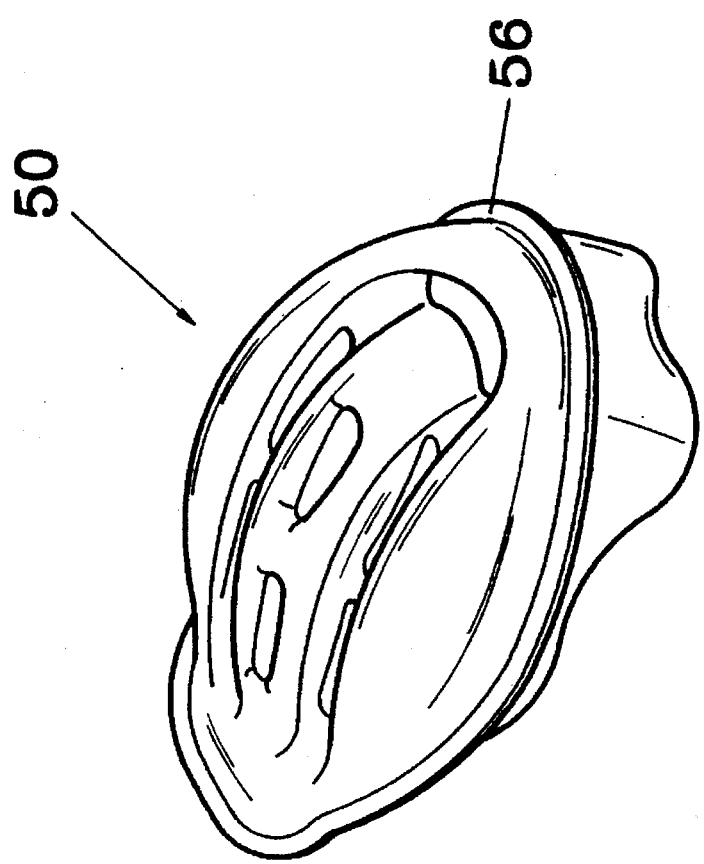
FIG. 20 is a perspective view of a semi-finished upper shell of a helmet according to the present invention.
Figure 21:
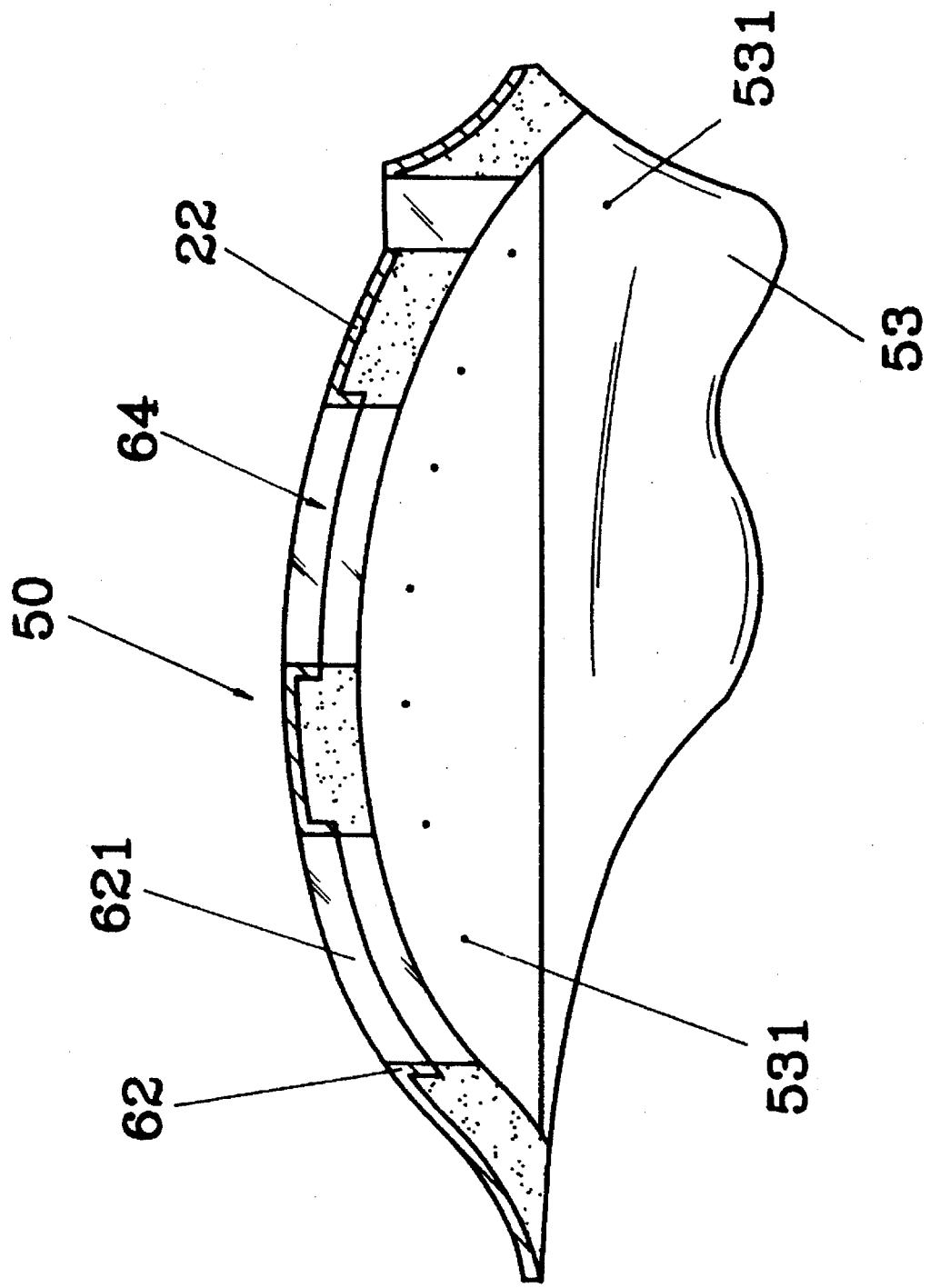
FIG. 21 is a sectional view of a finished helmet in which the recessed portions and the flashes are cut off from the upper shell according to the second preferred embodiment.

Referring to FIGS. 15 to 22, a second preferred embodiment of a process for making a helmet 50 which is formed with an upper shell 63 without a lower shell according to the present invention comprises the steps of:

(a) opening an upper die 61 relative to a lower die 62, cleaning the upper and lower dies 61, 62, and then heating the upper and lower dies 61, 62 to a temperature of 35° C. to 40° C. in the aforesaid oven 120 (not shown in this embodiment), the lower die 62 having a front end which is provided with an air hole 621, as shown in FIGS. 15(A) and 15(B);

(b) applying the releasing agent 15 onto the internal face of the lower die 62, as shown in FIG. 15(A);

(c) applying a painting 70 onto the releasing agent 15 of the internal face of the lower die 62, as shown in FIG. 15(B);

(d) heating the painting 70 for about 1 to 1.5 minutes or blowing the painting 70 by air in order to dry the painting 70 on the internal face of the lower die 62;

(e) placing a fibrous reinforcement 33 on the internal face of the lower die 62, as shown in FIG. 16;

(f) fitting a shape-molded plastic upper shell 63 which is printed with a predetermined pattern into the upper die 61, as shown in FIG. 17;

(g) filling a liquefied polyurethane mixture 32 into the lower die 62 from the polyurethane mixing and discharging machine 30 (not shown in this embodiment), as shown in FIG. 17;

(h) closing the upper die 61 in order to permit the polyurethane mixture 32 to begin to foam;

(i) shaking the upper and lower dies 61, 62 to permit the polyurethane mixture 32 to be applied uniformly onto the internal faces of the lower die 62 and the upper shell 63, as shown in FIG. 18;

(j) setting the upper and lower dies 61, 62 upright in order to permit a gas produced therein to escape through the air hole 621 of the lower die 62, as shown in FIG. 19;

(k) heating the upper and lower dies in the oven 120 for about 2 to 5 minutes to permit the polyurethane mixture 32 to be foamed completely, as shown in FIG. 19 and to permit the painting 70 to be hot-printed onto the foamed polyurethane;

(l) removing the upper and lower dies 61, 62 from the oven 120, cutting off a flash 321 formed outside the air hole 621, removing a semi-finished helmet 50 with said painting 70 being printed onto an face 53 of the helmet 50 from the upper and lower dies 61, 62, piercing through the semi-finished helmet 50 by means of needles 35 (not shown in this embodiment) in order to form a plurality of vent holes 531 which permit the residue gas in the semi-finished helmet 50 to escape to the exterior of the semi-finished helmet 50, as shown in FIGS. 20, 21, and then cooling in air for at least 8 hours.

The process of making the helmet 50 further comprises a step of removing recessed portions 631 of the upper shell 63 by means of a cutting tool in order to form a plurality of ventilation holes 64 in the upper shell 63, as shown in FIG. 21, and then surface-treating the semi-finished helmet 50 by means of cutting off the excess material 56 and flashes 321 of the helmet 50 to form a finished helmet 50, as shown in FIG. 20.

Figure 22:
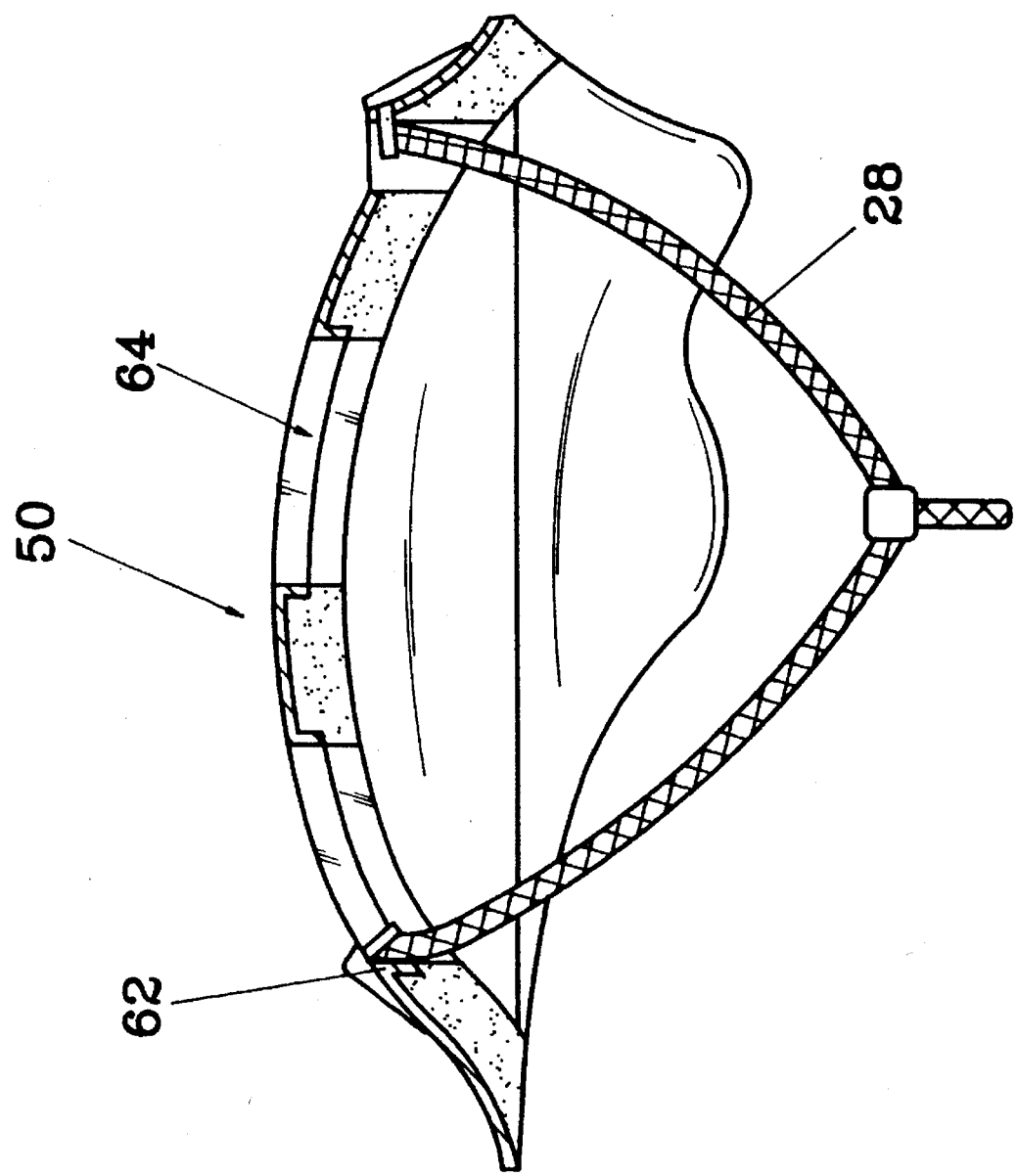
FIG. 22 is a sectional schematic view illustrating the finished helmet produced by the second preferred embodiment which has an attachment fastened thereto.

Predetermined attachments 28 can be fastened to the upper 63 of the finished helmet 50, as best illustrated in FIG. 22.

Figure 23:
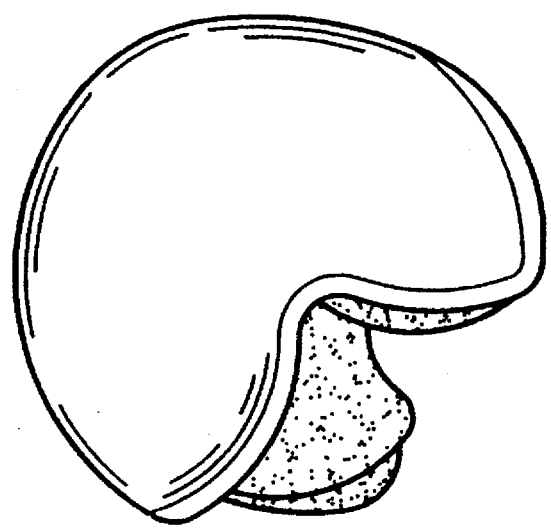
FIG. 23 showing a finished product according to the present invention.

In accordance with the present invention, the molding cavity of each of the upper and lower dies may have a smooth internal face in order to form a helmet without the ventilation holes, as best illustrated in FIG. 23.

The advantages of the process of making a helmet according to the present invention are as follows:

1. Only one oven is employed to heat the upper and lower dies and there are no bottom through holes in the lower die. In addition, there is no need to use a suction pump. Therefore, the manufacturing cost can be dramatically reduced.

2. Since the upper and lower shells are shape-molded according to the shapes of the upper and lower dies by means of vacuum forming processes and are printed with evenly distributed colors in a predetermined pattern before being inserted into the upper and lower dies, the finished helmet can be printed with patterns of different colors.

3. Since the upper and lower dies are shaken during foaming processes, the polyurethane mixture can be foamed effectively. In addition, because the foamed polyurethane is pierced by needles to allow the gas to escape completely therefrom, there are no gas bubbles formed in the finished helmet.

4. In the second preferred embodiment, because the painting is dried and then adhered to the foamed polyurethane by a hot-printing process, it can be attached uniformly and firmly to the helmet. In addition, the fibrous reinforcement can improve the structural strength and impact resistance of the helmet. Furthermore, the upper and lower dies are set upright to allow the gas in the mold to escape to the exterior. Therefore, the possibility of forming gas bubbles in the foamed polyurethane can be reduced.

5. The flashes of the foamed polyurethane can expand into the flash gates, preventing the air holes of the upper die being blocked.

6. When the upper and lower dies have smooth cavity faces, a helmet without ventilation holes can be made according to the process of the present invention.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangement.

I claim:

1. A helmet making process layer comprising the steps of:
   (a) opening an upper die which is formed with flash gates and air holes relative to a lower die which is attached to a conveying device, cleaning said upper and lower dies, heating said upper and lower dies to a temperature of 35° C. to 40° C. in an oven, and applying a releasing agent to outlet ends of said flash gates;
   (b) fitting a shape-molded plastic lower shell into said upper die, said lower shell being printed with evenly distributed colors in a predetermined pattern and having a plurality of recessed portions and a plurality of flash holes that are formed through an outer periphery of said lower shell;
   (c) filling a liquefied polyurethane mixture on a shape-molded plastic upper shell with a plurality of projected portions from a polyurethane mixing and discharging machine and then fitting said upper shell into said lower die;
   (d) closing said upper die and shaking said upper and lower dies when said upper and lower dies are moved by means of said conveying device in order to apply uniformly said liquefied polyurethane mixture to internal wall faces of said upper and lower shells and in order to allow said liquefied polyurethane mixture to begin to foam;
   (e) delivering slowly said upper and lower dies into said oven to heat said upper and lower dies about 2 to 5 minutes in order to allow said polyurethane mixture to be nearly completely foamed;
   (f) removing said upper and lower dies from said oven while said polyurethane mixture is foaming to allow a part of a foamed polyurethane to expand into said flash gates of said upper die and to form as a flash, and then piercing through said air holes of said upper die and through said lower shell by means of needles in order to allow a gas produced from said foamed polyurethane to escape to an exterior of said upper die through said air holes;
   (g) removing said flash and removing a semi-finished helmet thus obtained and piercing internal wall faces of said recessed portions in order to form a plurality of vent holes to allow said gas to escape through said vent holes and then allowing said semi-finished helmet to cool in air; and
   (h) cutting off said recessed and projected portions which abut complementarily one another from said upper and lower shells by means of a cutting tool in order to form a plurality of ventilation holes in said semi-finished helmet and then trimming and surface-treating said semi-finished helmet to produce a finished helmet.

2. A helmet making process as claimed in claim 1, further comprising a step of fastening predetermined attachments to said upper and lower shells of said helmet.

3. A helmet making process comprising the steps of:
   (a) opening an upper die relative to a lower die, cleaning said upper and lower dies and then heating said upper and lower dies to a temperature of 35° C. to 40° C. in an oven, said lower die having a front end which is provided with an air hole;
   (b) applying a releasing agent onto an internal face of said lower die;
   (c) applying a painting onto said releasing agent of said internal face of said lower die;
   (d) heating said painting for about 1 to 1.5 minutes or blowing said painting by air in order to dry said painting on said internal face of said lower die;
   (e) placing a fibrous reinforcement on said internal face of said lower die;
   (f) fitting a shape-molded plastic upper shell which is printed with a predetermined pattern into said upper die;
   (g) filling a liquefied polyurethane mixture into said lower die from a polyurethane mixing and discharging machine;
   (h) closing said upper die in order to permit said polyurethane mixture to begin to foam;
   (i) shaking said upper and lower dies to permit said polyurethane mixture to be applied uniformly onto said internal face of said lower die and an internal face of said upper shell;
   (j) setting said upper and lower dies upright in order to permit a gas produced therein to escape through said air hole of said lower die;
   (k) heating said upper and lower dies in an oven for about 2 to 5 minutes to permit said polyurethane mixture to be foamed completely and to permit said painting to be hot-printed onto a foamed polyurethane;
   (l) removing said upper and lower dies from said oven, cutting off a flash outside said air hole, removing a semi-finished helmet from said upper and lower dies, piercing through said semi-finished helmet by means of needles in order to form a plurality of vent holes which permit a residue gas in said semi-finished helmet to escape to an exterior of said semi-finished helmet, and cooling in air for at least 8 hours.

4. A helmet making process as claimed in claim 3, further comprising a step of removing recessed portions of said upper shell by means of a cutting tool in order to form a plurality of ventilation holes in said upper shell, and then surface-treating said semi-finished helmet to form a finished helmet.

5. A helmet making process as claimed in claim 3, wherein a molding cavity of each of said upper and lower dies has a smooth internal face in order to form a helmet without ventilation holes.

* * * * *